(No Model.) 2 Sheets—Sheet 1.
E. A. BLANTON, Jr.
COUPLING FOR SHAFTS.
No. 601,232. Patented Mar. 29, 1898.
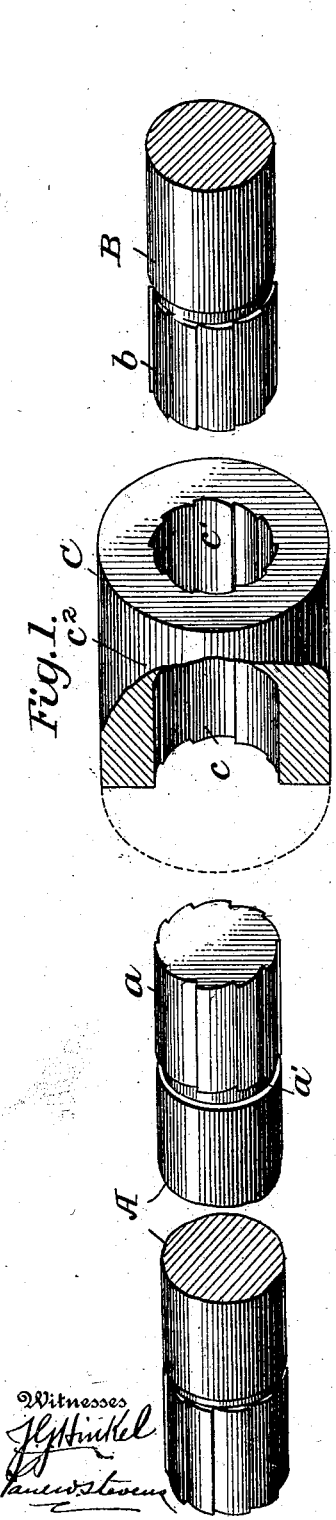
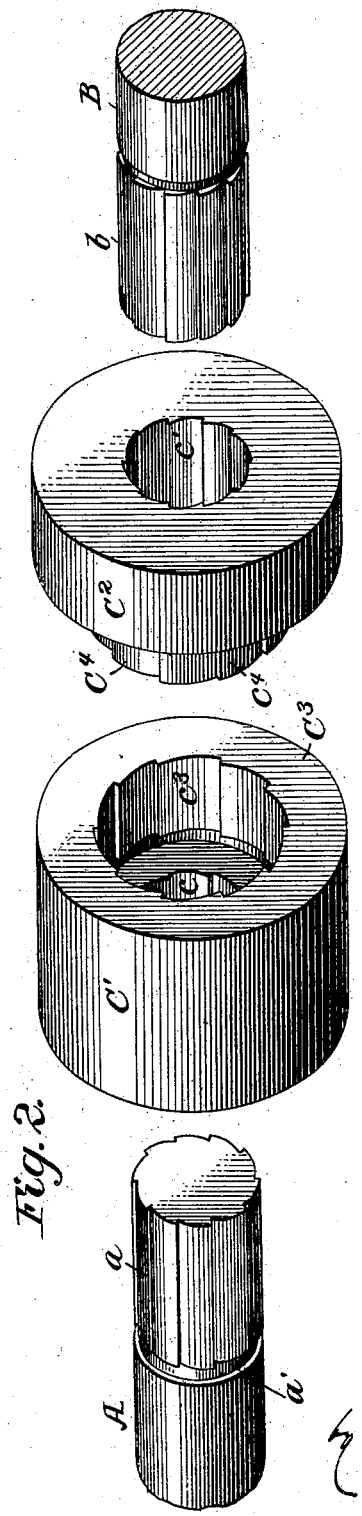
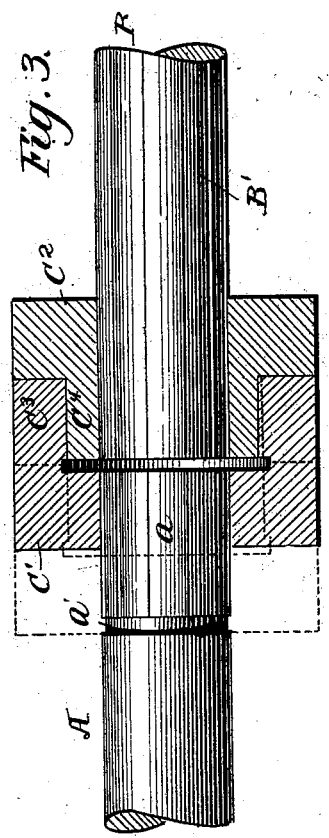
Witnesses
Inventor
Edward A. Blanton Jr.
Attorneys (No Model.) 2 Sheets—Sheet 2.
E. A. BLANTON, Jr.
COUPLING FOR SHAFTS.
No. 601,232. Patented Mar. 29, 1898.
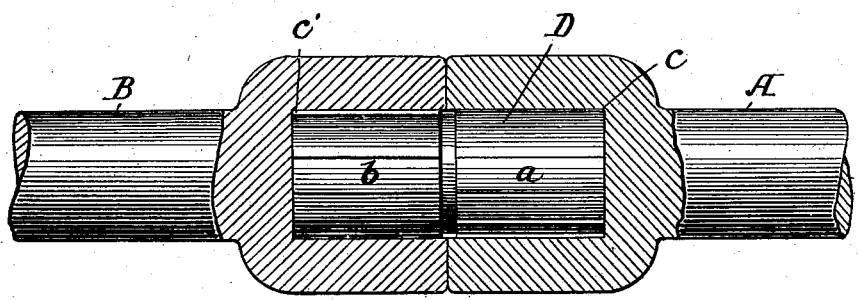
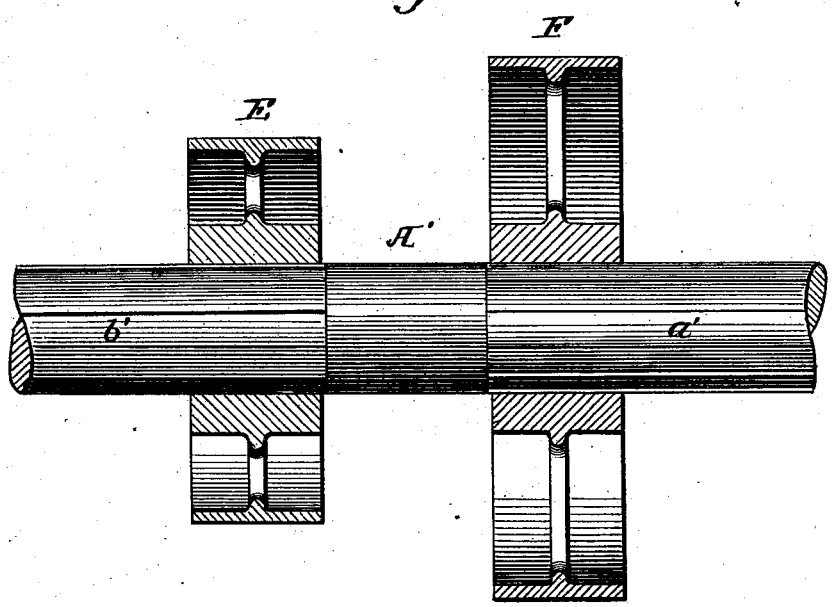

UNITED STATES PATENT OFFICE.

EDWARD A. BLANTON, JR., OF RIDLEY PARK, PENNSYLVANIA.

COUPLING FOR SHAFTS.

SPECIFICATION forming part of Letters Patent No. 601,232, dated March 29, 1898.

Application filed September 30, 1897. Serial No. 653,633. (No model.)

*To all whom it may concern:*

Be it known that I, EDWARD A. BLANTON, Jr., a citizen of the United States, residing at Ridley Park, in the county of Delaware and State of Pennsylvania, have invented a new and useful Coupling for Shafts, of which the following is a specification.

My present invention relates to a coupling for shafts and similar devices; and it has for its object to provide improved means whereby shafts, shaft-sections, and other devices may be quickly and effectively coupled together and in such a manner that they can be readily uncoupled when desired; and to these ends my invention consists in the various features of construction and arrangement of parts having the mode of operation substantially as hereinafter more particularly set forth.

Referring to the accompanying drawings, wherein I have shown an embodiment of my invention sufficient to enable those skilled in the art to make and use the same, Figure 1 is a perspective view of portions of two shafts and the coupling separated and partly in section in order to clearly show their construction. Fig. 2 is a similar view of a modification in which there is a flanged coupling. Fig. 3 is a longitudinal vertical section of the parts shown in Fig. 2. Fig. 4 is a longitudinal partly-vertical section of a modification, and Fig. 5 is a longitudinal vertical section showing a shaft of the character described acting as a coupling for driving and driven pulleys.

In my Patent No. 581,476, granted April 27, 1897, I have described and claimed, broadly, a shaft provided with a series of curved integral wedge-shaped bosses arranged in a circumferential line around the shaft adapted to be combined with a hub having a series of recesses to engage the bosses, so that the hub can be tightened on the shaft, and my present invention may be said to be an improvement on the subject-matter of said patent and an extension or application of the same general principles of construction applied more particularly to a shaft-coupling.

In carrying out my present invention as illustrated more especially in Fig. 1, A and B represent two shafts or shaft-sections or similar devices which are to be joined together, and C represents the connecting or coupling sleeve.

The shafts or shaft-sections to be joined are provided with a number of bosses or wedge-shaped portions $a$ $b$, respectively, extending longitudinally along the shaft for a sufficient distance to form the coupling and preferably formed integrally with the shaft. The number of bosses or wedge-shaped portions may vary according to the requirements of any particular case; but in the drawings I have shown ten wedges or bosses arranged circumferentially on the ends of the shaft-sections at equal distances apart. The outer surfaces of the bosses $a$ $b$ are on curves having gradually-increasing radii measured from the center of the shaft, either in the form of true eccentrics or involute curves or otherwise, the characteristic feature being that the curved surfaces of the bosses have gradually-increasing radii measured from the center of the shaft, as more fully set forth in my prior patent above referred to. The wedges or bosses preferably extend completely around the circumference of the shaft, although it is evident that the object of the invention can be accomplished to a greater or less extent by having the bosses extend partially around the circumference, leaving plain surfaces of greater or less extent between the lowest part of one boss and the highest part of the next succeeding boss; but in all cases it is desirable to have the bosses symmetrically arranged around the circumference of the shaft, so that it can be readily applied to the coupling-sleeve in different positions.

It will be seen that the ends of the shafts A and B adjacent to each other have the wedges or bosses arranged in opposition to each other—that is, the highest part of the wedges or bosses $a$ on the shaft A are farthest from the observer, while the highest part of the wedges or bosses $b$ on the shaft B are nearest to the observer, making, in fact, right and left hand arrangements of the wedges or bosses on the adjacent ends of the shafts to be coupled. The highest parts of these wedges or bosses are preferably on a longitudinal line with the remainder of the shaft, as shown in the drawings, and the lower parts are formed by cutting away portions of the shaft, although of course they may be otherwise made, and they may be formed in any mechanical way, although I have found it most practicable to turn them in a lathe. In this way the lower portions of the bosses are within the periphery of the shaft—that is, the diameter of the shaft through the line including two of the lower portions of opposite bosses is less than the diameter of the shaft, while in the form shown the diameter through the highest parts of two opposite bosses is the same as the diameter of the shaft. In some instances I find it advisable to groove the shaft adjacent the ends of the bosses, as at $a'$, the groove being preferably of a depth corresponding to the lower portions of the bosses, and when this is done the side of the groove will form an abutment for the coupling to prevent its moving too far on the shaft. When several sections of the shaft are to be joined, it is evident that the bosses at the opposite ends are arranged in opposition, as indicated in connection with the shaft A, and it will be seen that either end of the section can be united with the coupling-sleeve, as whichever end is presented to the sleeve the bosses will correspond in direction with the recesses in the sleeve, as hereinafter more fully set forth.

The connecting or coupling sleeve C is provided with a number of recesses $c\ c'$ in its bore or bearing-surface, corresponding with the number of bosses or wedges on the shaft, the recesses, however, being a little longer on their curved surfaces than the outer surfaces of the bosses or wedges, so as to leave a slight space between the thickened portion of the boss or wedge and the corresponding radial portion of the recess. The curved surfaces of these recesses of course are the complements of the curved surfaces of the wedges or bosses on the shaft. The recesses extend partially through the coupling-sleeve from each end, and, commencing at each end, they are in opposition to each other, as clearly shown in Fig. 1—that is, the high parts of the recesses $c$ are toward the observer, while the high parts of the recesses $c'$ are away from the observer, and preferably the high parts of the recesses $c$ are in line with the low parts of the recesses $c'$, although this is not essential. In practice I prefer to have a plain cylindrical surface between the inner adjacent ends of the recesses $c\ c'$, as shown at $c^2$, although this is not essential.

It will be observed that the recesses of the coupling are in opposition to each other, or, as it may be termed, "right and left handed" with relation to each other; but it will also be observed that the coupling can be turned either end to with relation to either one of the shafts A or B, as when turned in either position the curves of the recesses will correspond in direction with the curves of the bosses on either one of the shafts.

With this construction of the parts, in order to couple the shafts it is only necessary to insert the ends of the shafts into the opposite ends of the coupling, and then by slightly turning one of the shafts or shaft-sections in the proper direction the coupling-section is secured tightly on the shaft, the outer surfaces of the bosses bearing closely against the inner surfaces of the recesses in the coupling at its opposite ends, and they will remain thus securely fastened together until one portion of the shaft or the coupling itself is turned forcibly in the opposite direction, when the parts will be loosened, so that they can be readily removed.

In practice I have found that the bosses or recesses need have but a relatively small rise between their lowest and highest parts. For instance, in a shaft two inches in diameter on which there are ten bosses one thirty-second of an inch rise in the cams is entirely sufficient, and in a shaft five inches in diameter, with a similar number of bosses, the cams may have one-twentieth of an inch rise, and the lost motion between the tight and loose position under these conditions does not exceed one-sixteenth of an inch. It will thus be seen that the shafts and coupling-sleeve have very little motion with relation to each other between the tight and loose position, and this is an important advantage in coupling-shafts and other similar devices. Furthermore, if, for instance, a pulley or other device is desired to be attached to the shaft-sections the bosses or wedges may be extended longitudinally of the shaft, as indicated at $B'$, Fig. 3, and the pulley or other device may be slipped over the end of the shaft-section prior to its being coupled, and can be secured on the shaft by simply turning it slightly in a direction to bring the surfaces of the bosses and recesses together in a manner well understood.

In Fig. 1 the coupling-sleeve is shown integral, while in Fig. 2 I have shown a flanged coupling-sleeve, which is exceedingly useful in many instances—as, for instance, when it is desired to remove a shaft-section without the necessity of moving it longitudinally, so as to interfere with its bearings or devices carried thereon or otherwise—and in this case the coupling is made in two sections $C'\ C^2$, with the recesses $c\ c'$ formed in the bearing-surfaces of the two portions, the same as in the coupling C. The sleeve portion or flange $C^3$ is also provided with a series of recesses $c^3$; but, as shown in Fig. 2, these are in opposition to the recesses $c$, and the projecting portion $C^4$ of the section $C^2$ is provided with bosses or wedges $c^4$, and these are arranged in the same relation as the bosses $b$ on the shaft-section B, adapted to engage the recesses $c'$, so that a slight turn of either shaft-section A or B or of either of the sections $C'$ or $C^2$ of the coupling will lock the parts together and a slight turn of either portion in the opposite direction will unlock or release them. With this arrangement, as indicated in Fig. 3, the portion $C'$ of the coupling can be slipped longitudinally on the shaft-section A, when both the portion of the coupling and the shaft-section can be removed laterally without the necessity of moving either shaft-section longitudinally, and this is a great convenience when, for instance, any section of the shaft becomes injured or it is desired to change or rearrange the pulleys or bearings of the shaft or for other reasons which are apparent to those skilled in the art.

In Fig. 4 I have illustrated a modification in which the shaft-sections A B are formed at their ends with sockets adapted to receive a shaft-section D. This shaft-section, which in the present instance is shown as a short shaft, so that the adjacent ends of the sockets abut, but which of course can be a longer section separating the ends of the sockets, is provided with the bosses or wedge-shaped portions *a b*, oppositely arranged adjacent its ends, and these bosses or projections fit corresponding recesses *c c'* in the sockets of the shafts A and B, and their purpose and operation will be readily understood from what has been set forth above.

In Fig. 5 I have illustrated a modification of what may be termed a "coupling" between the driving and driven pulleys embodying the broad features of my present invention. In this case the shaft A' is provided with two sets of bosses or wedge-shaped portions *a' b'* at different parts of the shaft, arranged with their highest parts in opposition to each other, and mounted on the shaft and bearing on one set of bosses is a driven pulley E, while mounted on the shaft and bearing on the other set of bosses is the driving-pulley F, the hubs of the pulleys being recessed, of course, to correspond with the bosses or wedges. In this construction it will be seen that the shaft itself acts practically as a coupling between the driving and driven elements through the medium of the oppositely-faced wedge-shaped bosses.

From the above illustrations and description, which need not be further extended, the principles of my invention will be readily understood by those skilled in the art, and the advantages thereof will be apparent, and it is evident that I am not limited to the construction and arrangement of the parts shown in the drawings, as the principles of the invention may be embodied in other forms and under other conditions or applications without departing from the spirit thereof. It will be manifest also to those skilled in the art that the invention provides a self-centering and self-tightening construction, but one which can be readily loosened when for any purpose this is desirable.

What I claim is—

1. The combination with two shaft-sections each having a series of curved wedge-shaped bosses arranged in a circumferential line around its end, of a coupling-sleeve having two series of recesses to engage the bosses on the respective shaft-sections, the recesses being arranged in opposition to each other in the bearing of the coupling-sleeve, substantially as described.

2. The combination with two shaft-sections each having a series of curved wedge-shaped bosses arranged in a circumferential line around its end, of a flanged coupling having two series of recesses to engage the bosses on the shaft-sections arranged in opposition to each other in its bearing and having a series of bosses on the projecting portion and corresponding recesses in its flanged portion, substantially as described.

3. The combination in a coupling and driving mechanism, of driving and driven elements and a connecting element, said connecting element having two sets of wedge-shaped bosses arranged in opposition to each other and one set engaging with corresponding recesses in the driving element while the other set engages with corresponding recesses in the driven element, substantially as described.

In testimony whereof I have signed my name to this specification in the presence of two subscribing witnesses.

EDWARD A. BLANTON, JR.

Witnesses:
W. I. KLURG,
R. A. KIRKPATRICK.